United States Patent [19]

Haschke et al.

[11] 3,923,742

[45] Dec. 2, 1975

[54] PROCESS FOR THE PRODUCTION OF POLYCARBOXYLATES HAVING IMPROVED BIOLOGICAL DEGRADABILITY

[76] Inventors: Heinz Haschke, Grunaustrasse 17; Gerhard Morlock, Wildaustrasse 3, both of 6454 Grossauheim, Germany

[22] Filed: Nov. 11, 1974

[21] Appl. No.: 522,979

[30] Foreign Application Priority Data
Nov. 15, 1973  Germany............................. 2357036

[52] U.S. Cl........ 260/67 UA; 260/30.8 R; 260/73 L; 260/DIG. 43; 260/530 R
[51] Int. Cl.² C08G 20/06; C08G 16/34; C02C 1/40
[58] Field of Search............ 260/67 UA, 67 S, 73 L, 260/30.8 R, DIG. 43

[56] References Cited
UNITED STATES PATENTS

| | | | |
|---|---|---|---|
| 3,141,864 | 7/1964 | Rink................................ | 260/67 UA |
| 3,227,688 | 1/1966 | Kern et al...................... | 260/67 UA |
| 3,686,145 | 8/1972 | Haschke et al................ | 260/67 UA |

Primary Examiner—Lucille M. Phynes

[57] ABSTRACT

A process for the production of a polycarboxylate comprising oxidatively polymerizing acrolein or acrolein and acrylic acid in a heated, moving aqueous $H_2O_2$ solution and in the presence of about 0.1 to about 10.0 % by weight thioethylene glycol. The polycarboxylates are readily biodegradable rendering them especially suitable for use as phosphate substitutes in detergents and cleaning agents.

26 Claims, No Drawings

PROCESS FOR THE PRODUCTION OF POLYCARBOXYLATES HAVING IMPROVED BIOLOGICAL DEGRADABILITY

This invention relates to a process for the production of polycarboxylates from the oxidative polymerization of acrolein or acrolein and acrylic acid, and polycarboxylates produced thereby.

It is known in the art that acrolein can be polymerized oxidatively by itself or together with acrylic acid in such a way that the monomer or monomer mixture is dosed slowly into a heated, moving aqueous solution of hydrogen peroxide (German publ. pat. application No. 1,942,556). The poly (aldehydocarboxylic acids) obtained thereby in the form of an aqueous solution can optionally be neutralized with alkali metal hydroxides and/or evaporated to dryness.

It is also known that such poly (aldehydocarboxylates) can be reacted with alkali metal hydroxides according to Cannizzaro, whereby the corresponding poly (hydroxycarboxylates) are formed. (Germ. publ. pat. applic. No. 1,904,940).

The poly (aldehydocarboxylates), called "PAC" for short, and the poly (hydroxycarboxylates), called "POC" for short, as well as the poly (hydroxyaldehydocarboxylates) developing intermediarily during the Cannizzaro reaction, called "PAC" or "POC" for short depending on the prevalent character, are suitable as complexing agents for metal ions (cf. H. Haschke in Mh. Chem. 103, No. 2, 525 (1972)), and as so-called builders for building of solid or liquid detergents and cleaning agents with partial or complete substitutions of the phosphates used hitherto mainly for this purpose, especially penta sodium triphosphate (="sodium tripolyphosphate") or pyrophosphate [cf. Germ. publ. pat. applic. No. 1,962,125; 2,025,238; 2,044,601; Chemiker Ztg. 96 No. 4, 199, (1972)].

These compounds offer the possibility of an active contribution for the protection of the environment, because in consequence of their being free of phosphorus and nitrogen and because of their technical suitability as builders in case of their use as phosphate substitutes or as substitutes for recently partly used builders on an aminocarboxylate base, such as nitrilo triacetate (="NTA"), they help to reduce the danger or the problems of eutrophization of natural or "artificial" (e.g., hydrodams) standing or slow-flowing surface waters.

It is known, to be sure, that only about one-third of phosphates responsible for eutrophization in surface waters and contained in tributaries to these surface waters generally originate from these detergents and cleaning agents (the remaining two thirds are distributed fairly evenly between phosphates from human metabolism and phosphates from soil erosion from agricultural areas). Even a complete elimination of the phosphates from the detergents and cleaning agents would, therefore, not cause a conversion of eutrophic waters to the oligotrophic state, since even then sufficient phosphates would still be supplied from the remaining phosphate sources in order to maintain the eutrophic state or the danger of eutrophization generally. Nevertheless, every quantity of phosphate carried into eutrophic surface waters or waters endangered by eutrophization develops an ecologically strongly negative effect; the phosphate is indeed greatly enriched in (some) (varieties of) algae, so that these algae after decay and after they have sunk to the bottom of the water as mud (ooze) will act there as a "deposited phosphorous fertilizer". On the one hand this mud from the algae "cements" the bottom of the waters and thus disturbs the life habits of the water fauna; or else, this mud can plug up the gills of fish, and thus lead to a mass of dying fish. On the other hand, this algae-mud requires oxygen for its (aerobic) biological degradation so that there can be so much algae mud in eutrophic waters in which the growth of algae is rampant because of "over fertilization through phosphate", that in the layers of water on the bottom — and in case of less movement of the water also progressively in higher layers — the concentration of oxygen greatly decreases and even anaerobic conditions may occur. With that, however, the fish spawn on the bottom of the waters is killed, or the anaerobic decomposition of the mud can lead to the liberation of ammonia and hydrogen sulfide — quite apart from the fact that the overabundant growth of algae impedes the incidence of light even in the highest layers of water and even with this leads to decay of the aquatic fauna. All these phenomena are well known as the negative consequences of eutrophization. By a continuous input of phosphate in eutrophic waters or in waters endangered by eutrophization, and beyond that because of the phosphate-storage effect, this condition will be enhanced still further and even for the future with every ounce of phosphate reaching the water. Because of the "phosphate storage fertilizer effect" of the algae mud, some of the Bavarian lakes, for example, are permanently eutrophied even today to such an extent that even with an immediate cessation of any kind of phosphate input, regeneration periods of several decades would be necessary until an oligotrophic state could be achieved again.

In order to combat the problem of eutrophization, it would be highly desirable to undertake all measures, to keep any — even the smallest — quantity of phosphate away from the surface waters as much as possible. This would be in addition to the creation of suitable possibilities for the processing of waste water (sewage) (e.g., chemical precipitation of phosphate; which, however, also takes considerable time, during which the eutrophization problems continue to multiply and which under practical conditions does not always function absolutely reliably or sufficiently). Among these measures is, above all, the reduction of the amount of phosphate or substitution of other substances for phosphates in detergents and cleaning agents.

Naturally, a suitable phosphate substitute must have the necessary ecological compatibility beside perfect technical washing and toxicological characteristics. Other important characteristics are on the one hand the behavior of this product vis-a-vis heavy metal minerals or its behavior in conventional waste water (sewage) clarification processes, and on the other hand particularly its biological degradability. While the suitability of the above-mentioned POC or PAC compounds for laundering operations has been proven, and these products are also unobjectionable as builders from a toxicological point of view, a certain biological degradability of the PAC or POC compounds produced according to known process does indeed exist. It is, however, in dependence on the special PAC or POC-type. In the best of cases biological degradability is just so high that — corresponding to the yardsticks as applied today for anionic surfactants — the degradability can be designated as "still (barely) sufficient." For example, a poly (hydroxycarboxylic acid)-sodium salt having a mean degree of polymerization of 20 with a $COO^-$ —:OH — group numerical ratio (inclusive of the terminal groups) of 4, produced by oxidative copolymerization of acrolein with acrylic acid and subsequent Cannizzaro-reaction shows in the "closed bottle test" according to W. K. Fischer ("G F test"), (Fats - Soaps - Paints 65, No: 1, 37 (1963)) a decomposition value after 30 days of experiment of 35–40%, and can just barely be classified according to W. K. Fischer [Surfactant Detergents 8 No: 4, 182 (1971)] as "just sufficiently" biologically degradable. The same results are obtained in the GF test with the corresponding poly (aldehydocarboxylate). By "corresponding" we understand here that the mentioned poly (hydroxycarboxylate) develops from this poly (aldehydocarboxylate) by Cannizzaro reaction.

Thus, there exists a need in the art for polycarboxylates and a process for the production of polycarboxylates having improved biodegradability. The polycarboxylates should have the usual necessary ecological compatibility and washing and toxicological characteristics. They should be compatible with conventional waste treatment processes, and exhibit the usual desirable behavior toward heavy metal ions.

Accordingly, this invention aids in fulfilling these needs by providing a process for the production of polycarboxylates having improved biological degradability. The process comprises oxidatively polymerizing acrolein or acrolein and acrylic acid. The monomer or monomer mixture is dosed slowly into a heated, moving aqueous hydrogen peroxide solution. Subsequent neutralization or reaction according to Cannizzaro is optional. An essential aspect of the invention involves conducting the polymerization in the presence of about 0.1 to about 10.0% by weight thioethyleneglycol, related to the weight of the monomer or monomer mixture. This invention also provides the products of the process of the invention.

The process of this invention can be used for the polymerization of acrolein by itself alone, or else for the copolymerization of acrolein with up to about 50 mole %, preferably up to about 35 mole %, especially with about 10 to about 30 mole % acrylic acid. The monomer or monomer mixture is dosed into a moving, e.g., agitated, aqueous hydrogen peroxide solution comprising about 10 to about 35 % by weight, preferably about 15 to about 25% by weight hydrogen peroxide. The $H_2O_2$ solution is heated to a temperature of about 55° to about 95°C, preferably about 65° to about 85°C. About 1.0 to about 1.2 moles of acrolein are employed for each mole of $H_2O_2$ employed. The dosing in of the monomer or monomer mixture takes place within a time of up to about 7 hours, typically about 2 hours to about 7 hours, preferably about 3 to about 5 hours.

The thioethylene glycol (2-mercaptoethanol) employed in the process of this invention is utilized in a quantity of about 0.1 to about 10.0% by weight, preferably about 0.5 to about 5.0% by weight, especially about 1.0 to about 2.0% by weight, related to the weight of the monomer or monomer mixture.

The poly (aldehydocarboxylic acids) formed during the polymerization, the salts of which, obtainable by neutralization with alkali metal hydroxides or the poly (hydroxycarboxylates) produced from them in an aqueous solution by Cannizzaro reaction, are considerably more degradable biologically than all analogous PAC's or POC's produceable according to all the known processes, i.e. developing from equal, relative molar portions of acrolein, acrylic acid and $H_2O_2$ at equal concentrations of reactants.

The thioethyleneglycol can be mixed into the monomer or the monomer mixture, and the resulting mixture can be dosed into the hydrogen peroxide solution. However, thioethyleneglycol can also be dosed in separate from the monomer or monomer mixture. Preferably, however, at least a portion of the thioethyleneglycol to be employed is combined with the hydrogen peroxide solution. The remainder can then be dosed in alone or in solution with the monomer or monomer mixture. When dosed in alone, the dosing in can take place by portions or continuously. Whenever the thioethyleneglycol is dosed in separately from the monomer or monomer mixture, it will be effective in any case to select a dosing rate such that at the time when 50% of the entire monomer or monomer mixture has been added to the reaction mixture, at least 50% of the quantity of thioethyleneglycol that is to be employed will also have been dosed in, and that the addition of the thioethyleneglycol will be completed at the latest at the end of the dosing-in of the monomer or monomer mixture. It is preferred to employ all of the thioethyleneglycol from the beginning together with the hydrogen peroxide solution.

The monomer or monomer mixture employed can contain up to about 500 ppm of customary stabilizers (against spontaneous radical polymerization), such as hydroquinone or hydroguinone ether (e.g. hydroquinone monomethyl ether).

If in the course of the polymerization reaction foaming of the reaction mixture is too great, then small quantities of a commercial silicone-based defoaming agent can be added, or lower alcohols, such as methanol, ethanol, propanol, isopropyl alcohol and butanol can be added.

Toward the end of the dosing-in of the monomer or monomer mixture, i.e., after about 80% of the monomer or monomer mixture has been added, it is recommended to dilute the reaction mixture by the addition of water to such a point that finally about 20–40% by weight, preferably about 25–40% by weight poly (aldehydocarboxylic acid)-solutions are obtained. As a result, the solutions remain more easily stirrable, and any possibly still occurring branching reactions will be suppressed still further. Such branching reactions would have a negative influence on the biological degradability of the polycarboyxlates.

For the production of the alkali salts of the poly (aldehydocarboxylic acids) obtained according to the process of this invention, the aqueous poly (aldehydocarboxylic acid) solutions being obtained according to the process can be neutralized directly with alkali metal hydroxides. At the same time one should take care that the neutralization is accomplished so carefully (operating in sufficiently dilute solution or with sufficiently dilute alkali metal hydroxide solutions, or sufficiently slow dosing in of alkali metal hydroxide with sufficiently good intermixing), that no aldol condensations develop on the poly (aldehydocarboxylates) through local over-concentrations of alkali. This would result in inter- or intra-molecular cross linkages, which have a very unfavorable effect on the biological degradability of these compounds. The same is true for the production of the corresponding poly (hydroxycarboxylates) by Cannizzaro reaction of the poly (aldehydocarboxylates) in the presence of alkali metal hydroxides. The Cannizzaro reaction can also be carried out in the presence of formaldehyde; one will then have beside the Cannizzaro reaction also a formaldehyde condensation on the poly (aldehydocarboxylates) by way of H-atoms in $\alpha$-position relative to the carbonyl groups. The execution of the Cannizzaro reaction—also in the presence of formaldehyde—on the polyaldehydic compounds or on such poly (aldehydocarboxylates) has already been described by R. C. Schultz et al. [Natural Sciences, 45, (1958) 440; Applied Chemistry 76, No: 9, (1964) 357; Macromol. Chem. 67 (1963) 187], by G. Bier et al. [Macromol. Chem. 92 (1966) 240], and by H. Haschke [Mh. Chem. 103 (1972) 525]. Logically, the neutralization of the poly (aldehydocarboxylic acids) to poly (aldehydocarboxylates) must be carried out correspondingly carefully.

After completion of the dosing in of monomers, it is recommended to keep the reaction mixture for some hours—effectively while still stirring in the beginning—at temperatures between about 40° and about 90°C, preferably between about 50° and about 75°C, in order to achieve as complete a conversion of the monomers as possible. After a "secondary reaction time"—i.e., the time after completion of the dosing in of monomers—of about 12 hours, an approximately 90 to 99% conversion of monomers is achieved. Remaining monomers can be largely removed from the reaction mixture in the customary way (e.g., by distillation or by way of film evaporators), preferably by distilling off under reduced pressure about 10 to 40% of the volume of the reaction mixture.

The poly (aldehydocarboxylic acids) which can be produced according to the process of this invention can be described as linear polymers or oligomers, which are built up of units of the formulas:

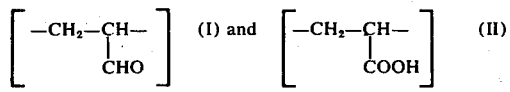

beside small (i.e., 0–20 basic mole %) quantities of units of the formula

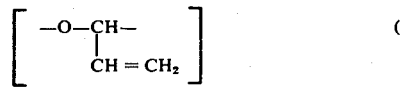

The units of the formula (III) develop, since the possibility can never be excluded even under radical reaction conditions—as in case of the process of this invention—that beside the preferred acrolein — C — C — polymerisation, acrolein — C — O — polymerisates are also formed, albeit in a far lesser quantity. These units, however, also exercise a certain, even though far more subordinate, positive influence on the biological degradability of the polymers. This corresponds to the known fact that polyethers are far more easily biologically degradable than polymers with only C—C chains (e.g., polyethylene oxides as compared to polyethylene). The effect, among others, is responsible for the fact that poly (aldehydocarboxylates) and poly (hydroxycarboxylates), which were produced from poly (aldehydocarboxylic acids), which had been obtained according to the process of oxidative homopolymerisation of acrolein or the process of oxidative copolymerisation of acrolein and acrylic acid according to KH. Rink (Germ. Pat. 1 071 339) and according to H. Haschke (Mh. chem. 103, No: 2, (1972) 525), are per se already considerably more easily biologically degradable than all comparable polyelectrolytes that can be produced according to other processes. Nevertheless, the effectiveness of this action too has its limits, because on the one hand in case of oxidative (co)-polymerisation of acrolein, the proportion of units of formula (III) in the PAC's produced cannot be raised arbitrarily (the limit lies at about 20 basic mole%), and on the other hand, an increase of the proportion of units (III) does produce practically no essential contribution to the biological degradability of the PAC's beyond about 2–4 basic mole %.

Although by dosing in of thioethylene glycol during the oxidative acrolein - (co)polymerisation according to the process of this invention, the proportion of units of formula (III) in the PAC's produced is practically not changed—probably because an influencing of the growth of the molecules in the course of the oxidative (co)polymerisation, which is particularly favorable and surprising for the biological degradation—the biological degradability of the compounds produced thus is improved non-sequentially from the area of "not sufficient" to "barely sufficient" biological degradability to the area of "sufficient" to "good" biological degradability.

The poly (aldehydocarboxylic acids) obtained according to the process of this invention were characterized by determining viscosimetrically a mean degree of polymerization, related to the number of the hypothetical formula units:

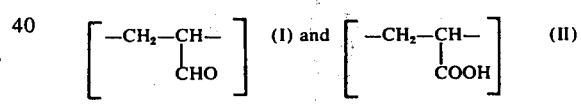

The method for the determination of the mean degree of polymerisation of polyacroleins is described by R. C. Schulz, H. Cherdron and W. Kern [Macromol. Chem. 24, 151 (1957)]. For this purpose the reduced viscosity (= specific viscosity/C) was determined in deciliters per gram on 1% poly (aldehydocarboxylic acid) solutions.

For the preparation of the 1% poly (aldehydocarboxylic acid) solution, corresponding quantities of 5% aqueous $SO_2$ solution are first poured over the free poly (aldehydocarboxylic acids) produced in form of dry powders from the poly (aldehydocarboxylic acids) by evaporation of the water, possibly after destruction of possibly present residual peroxides, and then after complete solution has occurred is filled up with the same volume of 10% aqueous NaCl solution. The viscosimetric measurement is made at 20°C.

A continuous curve-path of the points:

| $\bar{P}$ | | 2 | 3 | 4 | 5 | 6 | 7 | 8 | 9 | 10 |
|---|---|---|---|---|---|---|---|---|---|---|
| $\eta$ red | | 0.016 | 0.024 | 0.028 | 0.033 | 0.038 | 0.040 | 0.043 | 0.045 | 0.047 |
| $\bar{P}$ | | 20 | 30 | 50 | 70 | 100 | 300 | 500 | | |
| $\eta$ red | | 0.060 | 0.065 | 0.073 | 0.080 | 0.095 | 0.20 | 0.30 | | | plotted by means of vapor pressure-osmometric methods on poly (aldehydocarboxylic acid) - methyl esters was made the basis of a calibration curve. The poly (aldehydocarboxylic acid) - methylesters required for plotting the calibration curve were produced by methylation of pure powdery poly (aldehydocarboxylic acids), on which values of the reduced viscosity in 1% $SO_2$ - NaCl solutions had already been measured according to Schulz's method using diazomethane in benzene according to A. Katchalski and H. Eisenberg (J. Polym. Sci. 6, No: 2(1951) 145).

Moreover, the content of the carbonyl groups was determined on the powdery, dry poly (aldehydocarboxylic acids) according to the oximation reaction (e.g. with hydroxylamine hydrochloride) according to R. C. Schultz, H. Fauth and W. Kern (Macromol. Chem. 20 (1956) 161). The determination of the carboxyl contents of the poly (aldehydocarboxylic acids) was accomplished by simple alkaliacidimetric titration, i.e. titration of poly (aldehydocarboxylic acid) suspensions with 0.1 n NaOH against phenolphtalein up to the first rose hue; then an excess of 5 ml 0.1 n NaOH was added and immediate re-titration with 0.1 n HCl was carried out.

The carbonyl or carboxyl contents of the poly (aldehydocarboxylic acids) were given in basic mole % (Bas. Mole %) according to E. Trommsdorff (Dissert. Freiburg in Br. 1931). For this purpose the value $M_2 = 56.x + 72.y$ was made the base as mole weight $\overline{M}_2$ of a mean formula unit

—therefore of a mean $C_2$ unit in the molecule chain— whereby y = bas. mol % COOH/100 and x = 1−y.

The poly (aldehydocarboxylic acids) obtained at first according to the process of this invention can be reacted in aqueous solution or suspension with a strong base, optionally in the presence of formaldehyde. In this case one can proceed in such a way that one uses the formaldehyde in about stoichiometric quantities in relation to the aldehydic groups present in the polymer, and this is stirred for some time at room temperature or at an elevated temperature up to about 100°C, preferable about 20° to about 60°C, especially about 20° to about 45°C, while adding alkali gradually. After two hours the conversion can, for example, already amount to 60 to 70% of the theoretically complete conversion, and it can rise within 8–24 hours to 90 to 100% of the theoretically complete conversion. In case of conversion into solutions, one will arrive at solutions which contain an excess of alkali, beside the salts of the poly (hydroxy aldehydocarboxylic acids) or poly (hydroxycarboxylic acids). They can be evaporated to dryness. By precipitation from the reaction preparation, e.g. with methanol, the salts will be obtained in a particularly pure form. But it is also possible to neutralize the solution prior to evaporating with a dilute acid, e.g. hydrochloric acid or preferably formic acid, sulfuric acid or phosphoric acid, or to precipitate the free acids.

The neutralization of the excess of alkali is to be accomplished effectively only with acids, the salts of which do not materially affect the polymers during use of the polymers. For this purpose, for example, one can employ carbon dioxide, hydrochloric acid, sulfuric acid, phosphoric acid, formic acid or acetic acid. But it is advantageous to use for this purpose the poly (hydroxyaldehydocarboxylic acids) or poly (hydroxycarboxylic acids) even in pure solid form or in solution, or else according to a particularly preferred variation the poly (aldehydocarboxylic acids) obtained during the above-mentioned production reaction as an intermediate product, in aqueous solution or in solid form. In this way one will directly obtain neutral solutions of the salts of the poly (hydroxyaldehydocarboxylic acids) or poly (hydroxycarboxylic acids). In the main chain they have overwhelmingly C—C bonds. The polymers contain in any case units (IIa) and (IV), as well as possibly units (I) and/or (III):

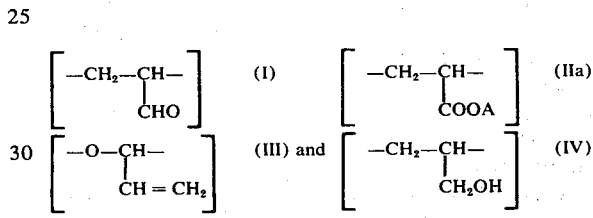

These units are developed in part during the treatment of the poly (aldehydocarboxylic acids) according to Cannizzaro reaction.

Whenever the conversion of the poly (aldehydocarboxylates) is carried out with strong bases according to Cannizzaro in the presence of formaldehyde, then units of the general formulas (V) and (VI) will develop:

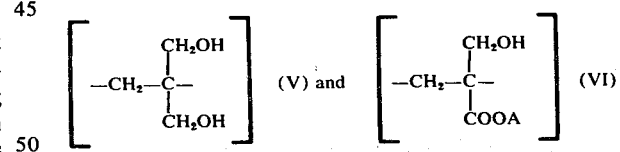

Although the oxidative polymerization or copolymerization of acrolein is a radical polymerization, nevertheless units of the general formula (III) can be present in subordinate quantities up to 20 basic mole % in the main chains of the poly (aldehydocarboxylates) and also the poly (hydroxyaldehydocarboxylates) or poly (hydroxycarboxylates) produced from it by Cannizzaro reaction. They develop by polymerization with openings of the carbonyl double bond of the acrolein.

In the formula units (IIa) and (VI), A stands for an alkali metal and/or hydrogen and/or ammonium, preferably for an alkali metal or hydrogen atom.

Since the PAC's, produceable according to the process of the invention or the POC's derived from them by Cannizzaro reaction, are very weak acids in the form of the free acids, the aqueous solutions of their complete salts have pH values which lie more or less strongly in the alkaline area. Beyond that, these substances as polyelectrolytes show the peculiarity that—in contrast to the classical, simple electrolytes—they do not completely dissociate into their ions ("primary dissociation") in aqueous solution practically in all concentrations [J. Am. Chem. soc. 72 (1950), 2636]. Consequently, in case of dilution of such polyelectrolyte - salt solutions first the effect of the primary dissociation predominates, as a result of which additional groups of carboxylates become free, which as anion-bases in hydrolysis equilibrium give rise to an increase in pH and lead to a decrease in pH only after complete primary dissociation. This corresponds to the behavior of classical, simple electrolytes according to the (Oswalds') law of dilution.

The corresponding compounds representing partial salts of the poly (aldehydocarboxylic acids), poly (hydroxyaldehydocarboxylic acids) or poly (hydroxycarboxylic acids), therefore the so-called "hydrogen salts," can also be used to advantage, e.g. as builders in detergents and cleaning agents.

For the determination of the biological degradation of such compounds it will naturally be appropriate to use such salts which will shift the pH of the degradation solutions (it is generally around pH=7) in case of the desired test substrate concentration, as little as possible.

This invention will be described in greater detail in the following examples in which all parts, proportions, ratios and percentages are by weight unless otherwise indicated.

EXAMPLE 1

To a 4 l three necked flask equipped with mechanical paddle agitator, reflux cooler, automatic temperature control by way of a resistance thermometer and a drop-in graduated funnel with 100 ml capacity and attached by way of a Claisen attachment beside the inlet for the thermometer, a mixture consisting of 780 ml distilled water, 900 ml 35% by weight hydrogen peroxide and 8.65 g thioethylene glycol was added. The resulting preparation of 21% by weight $H_2O_2$ was heated to 55°C while stirring in a 70°C thermostat-controlled water-bath. Then the addition of a mixture of 780 ml freshly distilled acrolein and 198 ml stabilized (with 500 ppm hydroquinone monomethyl ether) acrylic acid (Corresponding to 20 mole % acrylic acid in the monomer mixture) was started at a rate of addition of about 245 ml per hour. Thus altogether, the 978 ml of monomer mixture were added within about 4 hours.

The thermostat-controlled water bath was kept at 70°C during the entire reaction; the temperature of the reaction mixture rose to 70°C shortly after the start of the addition of the monomer mixture, and was kept at 70°-80°C during the entire period of addition of monomers.

After 910 ml of monomer mixture had been added, the reaction mixture was diluted with 63 ml of distilled water. Likewise distilled water was added after 940 ml of monomer mixture had been added, and finally once more after the end of addition of monomer. After completion of dosing-in of monomers, stirring was continued for 3 hours in the water bath thermostat-controlled at 60°C. Then the heating for the water bath was turned off and the preparation was left alone for 14 hours.

After that, 20 vol. % of the preparation was distilled off in a water jet vacuum. The residue represented an approximately 35% by weight aqueous solution of a poly (aldehydocarboxylic acid) with a median degree of polymerization of 17 (eta-red = 0.058 dl/g), a carbonyl content of 27.0 basic mole % and a carboxyl content of 70.5 basic mole %. [The remaining 2.5 basic mole % correspond to vinyl groups from units of formula (III)].

Checking the biological degradability:

A. On the poly (aldehydocarboxylate)

820 ml of the above mentioned poly (aldehydocarboxylic acid) solution were prepared in a 4 l three necked flask. While stirring the reaction mixture and cooling it slightly (water bath), 190 ml of a 45% by weight caustic soda solution (aqueous liquor) were dosed in within 2 hours. The pH of the reaction mixture was controlled continuously electrometrically in the course of the neutralization. As soon as the reaction mixture had reached a ph value of 7.0, the dosing in of alkali was stopped. The poly (aldehydocarboxylate) solution obtained was reduced to dryness by evaporation of the water, the residue was ground and was afterdried once more at 120°C in a water jet vacuum (12 mm) for 3 hours as a powder. The pure poly (aldehydocarboxylate) thereby obtained was used in the GF test according to W. K. Fischer for the determination of the biological degradability. The BSBT value (= theoretical biochemical oxygen requirement for complete biological oxidation expressed in mg $O_2$ per 100 mg substrate) of the poly (aldehydocarboxylete) was 126.4.

In case of a substrate concentration of 2 ppm, an oxygen consumption of 1.45 ppm was measured with this in the GF test (starting out from air-saturated water and in case of an in-oculation with about 500 germs per $cm^3$ from filtered activated sludge suspension from a community sewage plant) after 30 experimental days, which corresponds to a biological degradation rate under GF test conditions of 57%.

B. On the poly (hydroxycarboxylate):

810 ml of the above mentioned poly (aldehydocarboxylic acid) solution were put in a 4 l three necked flask. While stirring the reaction mixture and cooling it slightly (water bath), 190 ml of a 45% by weight caustic soda solution (aqueous solution) were dosed in within 2 hours. The pH of the reaction mixture was continuously controlled electrometrically in the course of the neutralization. After dosing in of this first NaOH charge the reaction mixture had a pH of 7.0. Addition of another 40 ml of 45% by weight NaOH was made within 4 hours, as a result of which the pH of the reaction mixture was raised to 12. This pH was kept for 3 hours by continuous replacement of the caustic soda solution used up by the continuing Cannizzaro reaction. Altogether, 298 ml of the 45% by weight NaOH solution were consumed. Subsequently, neutralization was accomplished with a residue of not yet used poly (aldehydocarboxylic acid) solution from the same polymerization prepration to a pH=7 with consumption of 25 ml of this acid solution. The poly (hydroxycarboxylate) solution obtained was dried by evaporation of the water, the residue was ground up and once more afterdried as a powder at 120°C in a water jet vacuum (10 mm Hg) for 3 hours. The poly (hydroxycarboxylate) obtained thereby was used for the determination of the biological degradability in the G.F. test according to W. K. Fischer. The BSBT value (expressed in mg $O_2$ per 100 mg substrate) of the poly (hydroxycarboxylate) was: 117.1.

In case of a substrate concentration of 2 ppm, (starting out from air saturated water and at an in-oculation with about 500 germs/cm³ from filtered activated sludge suspension from a community sewage plant) an oxygen consumption of 1.24 ppm was measured after 30 days of experimentation, which corresponds to a biological degradation under GF test conditions of 53%.

COMPARATIVE EXPERIMENT 1

Example 1 was repeated for the sake of comparison, but the use of the thioethylene glycol was omitted:

To a 4 l three-necked flask equipped with mechanical paddle agitator, reflux cooler, automatic temperature control by way of a resistance thermometer and a drop-in graduated funnel with 100 ml capacity attached via a Claisen attachment beside the inlet for the thermometer, a mixture consisting of 780 ml of distilled water and 900 ml of 35% by weight of hydrogen peroxide was added. In a water bath, controlled by thermostat at 60°C, the mixture of 21% by weight $H_2O_2$ thus produced was heated to 55°C while stirring. The addition of a mixture of 780 ml freshly distilled acrolein and 198 ml of stabilized (with 500 ppm hydroquinone monomethyl ether) acrylic acid was started at an addition rate of about 245 ml/hour. Altogether, the 978 ml of monomer mixture was added within about 4 hours. The thermostat-controlled water bath was kept at 60°C during the entire reaction; the temperature of the reaction mixture rose in the course of the reaction to a maximum of 75°C.

After 910 ml of monomer mixture had been added, the reaction mixture was diluted with 63 ml of distilled water; likewise after 940 ml of monomer mix had been added and finally once more after the end of the monomer addition. After the completion of dosingin monomers, stirring was continued for another 3 hours in the water bath thermostat-controlled at 60°C, then the water heating was turned off and the preparation was left to itself for 14 hours.

After that, 20 vol. % of the preparation was distilled off in a water jet vacuum after addition of 300 ml n-propanol. The residue represented an approximately 35% by weight, aqueous solution of a poly (aldehydocarboxylic acid) having a mean degree of polymerization of 20 (eta-red = 0.06 dl/g) a carbonyl content of 26 basic mole % and a carboxyl content of 71.5 basic mole %. [The remaining 2.5 basic mole % corresponded to vinyl groups from the units of the formula (III)].

Checking the biological degradability:

A. On poly (aldehydocarboxylate)

820 ml of the poly (aldehydocarboxylic acid) solution from comparative experiment 1 were added to a 4 l three-necked flask. While stirring the reaction mixture and cooling it slightly (water bath), 200 ml of a 45% by weight caustic soda solution (aqueous solution) were dosed in within 2 hours. The pH of the reaction mixture was controlled electrometrically continuously during the course of the neutralization. As soon as the reaction mixture reached a pH value of 7.0, the dosing in of the alkali was stopped. The poly (aldehydocarboxylate) solution obtained was dried by evaporation of the water, the residue was ground up and was after dried once more as a powder at 120°C in a water jet vacuum (12 mm) for 3 hours. The pure poly (aldehydocarboxylate) obtained was used for the determination of the biological degradability in the GF test according to W. K. Fischer. The BSBT value (= theoretical biochemical oxygen requirement for complete biological oxidation, expressed in mg $O_2$ per 100 mg substrate) of the poly (aldehydocarboxylate) amounted to: 125.6.

In case of a substrate concentration of 2 ppm, an oxygen consumption of 1.08 ppm was measured in the GF test (starting out from air saturated water and with an inoculation of about 500 germs/cm³ from filtered activated sludge suspension from a community sewage plant) after 30 days of experimentation, which corresponds to a biological degradation rate under GF test conditions of 43%.

B. On poly (hydroxycarboxylate)

820 ml of the above mentioned poly (aldehydocarboxylic acid) solution were put in a 4 l three-necked flask. While stirring the reaction mixture and slightly cooling it (water bath), 200 ml of a 45% by weight caustic soda solution (aqueous solution) were dosedin within 2 hours. The pH of the reaction mixture was continuously controlled electrometrically in the course of the neutralization. After dosing-in this first NaOH charge, the reaction mixture had a pH of 7.0. Addition of another 40 ml of the 45% by weight NaOH was accomplished within 4 hours, as a result of which the pH was raised to 12. This pH was maintained for 3 hours by continuous replacement of the caustic soda solution consumed by the continuing Cannizzaro reaction. Altogether, 300 ml of 45% by weight NaOH solution were consumed. Subsequently, neutralization took place with a residue of not yet used poly (aldehydocarboxylic acid) solution from the same polymerization preparation to pH = 7.0 consuming 30 ml of this acid solution.

The poly (hydroxycarboxylate) solution obtained was dried by evaporation of the water, the residue was ground and after dried once more at 120°C in a water jet vacuum (10 mm Hg) for 3 hours as a powder. The poly (hydroxycarboxylate) obtained was used for the determination of the biological degradability in the GF test according to W. K. Fischer. The BSBT value (expressed in mg $O_2$/100 mg substrate) of the poly (hydroxycarboxylate) amounted to: 116.7.

In case of a substrate concentration of 2 ppm, an oxygen consumption of 0.89 ppm was measured in the GF test (starting out from air saturated water and with an inoculation of about 500 germs/cm³ from a filtered activated sludge suspension from a community sewage plant) after 30 days of experimentation, which corresponds to a biological degradation of 38% under GF test conditions.

EXAMPLE 2

To a 4 l three-necked flask equipped with mechanical paddle agitator, reflux cooler, automatic temperature control by way of a resistance thermometer and a drop-in graduated measure with 100 ml capacity, attached via a Claisen attachment beside the inlet for the thermometer, a mixture of 450 ml distilled water, 540 ml of 35% by weight of hydrogen peroxide and 15 g thioethylene glycol was added. In a waterbath, controlled by thermostat at 70°C, the resulting preparation of 21% by weight $H_2O_2$ was heated to 65°C while stirring. Then addition of a mixture of 454 ml freshly distilled acrolein and 454 ml stabilized (with 500 ppm hydroquinone monomethyl ether) acrylic acid was started at an addition rate of about 227 ml per hour. Altogether, the 908 ml of monomer mixture were added within about 4 hours.

THe thermostat-controlled waterbath was kept during the entire reaction at 70°C; the temperature of the reaction mixture rose shortly after beginning of the dosing-in of the monomer to 70°C and was kept during the entire duration of dosing-in of monomers at 75°-85°C.

After 817 ml of monomer mixture had been added, the reaction mixture was diluted with 324 ml of distilled water; likewise, after 855 ml of monomer mixture had been added and finally once more after completion of the addition of monomer. After the end of the dosing in of monomers, stirring was continued for 3 hours in the waterbath controlled by thermostat at 70°C, then the heating for the water bath was turned off and the preparation was left to itself for 14 hours.

After that, 18 vol. % of the preparation was distilled off in a water jet vacuum. The residue represented an about 32% by weight aqueous solution of a poly (aldehydocarboxylic acid) having a mean degree of polymerization of 60 (eta-red = 0.077 dl/g), a carbonyl content of 20 basic mole % and a carboxyl content of 78.6 basic mole %. [The remaining 1.4 basic mole % corresponded to vinyl groups from the units of the formula (III)].

Checking the biological degradability:
A. On the poly (aldehydocarboxylate)

900 ml of the poly (aldehydocarboxylic acid) solution from Example 2 were put in a 4 l three-necked flask. While stirring the reaction mixture and slightly cooling it (water bath), 210 ml of a 45% by weight caustic soda solution (aqueous solution) were dosed-in within 2 hours. The pH of the reaction mixture was continuously controlled electrometrically in the course of the neutralization. As soon as the reaction mixture had reached a pH value of 7, the dosing in of alkali was stopped, the poly (aldehydocarboxylate) solution obtained was dried by evaporation of the water, the residue was ground and was after dried once more at 120°C in a water jet vacuum (12 mm) for 3 hours as a powder. The pure poly (aldehydocarboxylate) thus obtained was used for the determination of the biological degradability in the GF test according to W. K. Fischer. The BSBT value ( = theoretical biochemical oxygen requirement for complete biological oxidation, expressed in $mgO_2/100$ mg substrate) of the poly (aldehydocarboxylate) amounted to: 120.6.

In case of a substrate concentration of 2 ppm, an oxygen consumption of 0.98 ppm was measured in the GF test (starting out from air saturated water and with an inoculation of about 500 germs/cm$^3$ of filtered activated sludge suspension from a communal sewage plant) after 30 days of experimentation, which corresponds to a biological degradation rate under GF test conditions of 41%.

B. On the poly (hydroxycarboxylate)

900 ml of the poly (aldehydocarboxylic acid) solution from Example 2 were put in a 4 l three-necked flask. While stirring the reaction mixture and while cooling slightly (water bath), 210 ml of a 45% by weight caustic soda solution (aqueous solution) were dosed-in within 2 hours. The pH of the reaction mixture was continuously controlled electrometrically in the course of neutralization. After dosing-in this first NaOH charge, the reaction mixture had a pH of 7.0. Within 4 hours, another 60 ml of 45% by weight NaOH was added as a result of which the pH of the reaction mixture was raised to 12.5. This pH was maintained for 3 hours by continuous replacement of the caustic soda solution consumed by the continuing Cannizzaro reaction. Altogether 300 ml of 45% by weight NaOH was used up. Subsequently neutralization took place with a residue of not yet used poly (aldehydocarboxylic acid) solution from the same polymerization preparation to a pH=7, consuming 138 ml of this acid solution.

The poly (hydroxycarboxylate) solution obtained was dried by evaporation of the water, the residue was ground and was redried once more as a powder at 120°C in a water jet vacuum (20 mm Hg) for 3 hours. The poly (hydroxycarboxylate) obtained was used for the determination of the biological degradability, in the GF test according to W. K. Fischer. The BSBT value (expressed in mg $O_2$/100 mg substrate) of the poly (hydroxycarboxylate) was: 113.5

In case of a substrate concentration of 2 ppm, an oxygen consumption of 0.86 ppm was measured in the GF test (starting out from air saturated water and with an inoculation of about 500 germs/cm$^3$ of filtered activated sludge suspension from a community sewage plant) after 30 days of experimentation, which corresponds to a biological degradation under GF test conditions of 38%.

COMPARATIVE EXPERIMENT 2:

As a comparison, Example 2 was repeated, but the simultaneous use of thioethylene glycol was omitted:

In a 4 l three-necked flask equipped with mechanical paddle agitator, reflux cooler, automatic temperature control by way of a resistance thermometer and a drop-in graduated funnel with 100 ml capacity, attached via a Claisen attachment beside the inlet for the thermometer, a mixture of 450 ml distilled water and 540 ml of 35% by weight hydrogen peroxide was prepared. In a water bath, thermostat-controlled at 60°C, the preparation of 21% by weight $H_2O_2$ thus produced was heated to 55°C while stirring. The addition of a mixture of 454 ml freshly distilled acrolein and 454 ml stabilized (with 500 ppm of hydroquinone monomethyl ether) acrylic acid was started with a rate of addition of about 227 ml/hour. Altogether, the 908 ml of monomer mixture were added within about 4 hours.

The thermostat-controlled water bath was kept at 60°C during the entire reaction; the temperature of the reaction mixture rose in the course of the reaction to a maximum of 74°C.

After 817 ml of monomer mixture had been added, this was diluted with 324 ml of distilled water; likewise, after 855 ml of monomer mixture had been added and finally once more after the completion of the addition of monomers. After completion of the dosing-in of monomers, stirring was continued for another 3 hours in the water bath, thermostat controlled at 60°C, then the heating of the water bath was turned off and the preparation was left alone for 14 hours.

After that, 18 vol. % of the preparation was distilled off in a water jet vacuum. The residue represented a 32% by weight aqueous solution of a poly (aldehydocarboxylic acid) having a mean degree of polymerization of 60 (eta red = 0.077 dl/g), a carbonyl content of 20 basic mole % and a carboxyl content of 78.6 basic mole %. [The remaining 1.4 basic mole % corresponded to vinyl groups from the units of formula (III)].

Checking the biological degradability:
A. On the poly (aldehydocarboxylate)

900 ml of poly (aldehydocarboxylic acid) solution from comparative Example 2 were put in a 4 l three-necked flask. While stirring the reaction mixture and cooling it slightly (water bath), 210 ml of a 45% by weight caustic soda solution (aqueous solution) were dosed in within 2 hours. The pH of the reaction mixture was continuously controlled electrometrically in the course of the neutralization. As soon as the reaction mixture had reached a pH of 7, the dosing-in of alkali was stopped. The poly (aldehydocarboxylate) solution obtained was dried by evaporation of the water, the residue was ground and re-dried once more at 120°C in a water jet vacuum (12mm) for 3 hours as a powder. The pure poly (aldehydocarboxylate) obtained was used in the GF test according to W. K. Fischer for the determination of the biological degradability. The BSBT value (= theoretical biochemical oxygen requirement for complete biological oxidation expressed in mg $O_2$/100 mg substrate) of the poly (aldehydocarboxylate) amounted to: 120.6.

At a substrate concentration of 2 ppm, an oxygen consumption of 0.65 ppm was measured in the GF test (starting out from air saturated water and with an inoculation with about 500 germs/cm$^3$ of filtered activated sludge suspension from a community sewage plant) after 30 days of experimentation, which corresponds to a biological degradation rate under GF test conditions of 27%.

B. On poly (hydroxycarboxylate)

900 ml of poly (aldehydocarboxylic acid) solution from comparative Example 2 were put in a 4 l three-necked flask. While stirring the reaction mixture and cooling it slightly (water bath), 210 ml of a 45% by weight caustic soda solution (aqueous solution) were dosed in within 2 hours. The pH of the reaction mixture was continuously controlled electrometrically in the course of the neutralization. After dosing-in this first NaOH charge, the reaction mixture had a pH of 7.0. Addition of another 60 ml of 45% by weight NaOH took place within 4 hours, as a result of which the pH of the reaction mixture was raised to 12.5. This pH was maintained for 3 hours by continuous replacement of the caustic soda solution consumed by the continuing Cannizzaro reaction. Altogether 300 ml of the 45% by weight NaOH was consumed. Subsequently, neutralization took place with a residue of not yet used poly (aldehydocarboxylic acid) solution from the same polymerization preparation to a pH=7, consuming 138 ml of this acid solution.

The poly (hydroxycarboxylate) solution obtained was dried by evaporation of the water, the residue was ground and re-dried once more at 120°C in a water jet vacuum (20 mm Hg) for 3 hours as a powder. The poly (hydroxycarboxylate) obtained was used in the GF test of W. K. Fischer for determination of the biological degradability. The BSBT value (expressed in mg $O_2$ per 100 mg substrate) of the poly (hydroxycarboxylate) amounted to: 113.5.

In case of a substrate concentration of 2 ppm, an oxygen consumption of 0.58 ppm was measured in the GF test (starting out from air-saturated water and with an inoculation of about 500 germs/cm$^3$ of filtered activated sludge suspension from a community sewage plant) after 30 days of experimentation, which corresponds to a biological degradation of 25% under GF test conditions.

EXAMPLE 3

In a 4 l three-necked flask with mechanical paddle agitator reflux cooler, automatic temperature control by way of a resistance thermometer and a drop-in graduated funnel with 100 ml capacity, attached via a Claisen attachment beside the inlet for the thermometer, a mixture of 450 ml distilled water and 540 ml of 35% by weight hydrogen peroxide was prepared. In a water bath thermostat-controlled at 70°C, the resulting preparation of 21% by weight $H_2O_2$ was heated to 65°C while stirring. After addition of 8.6 g of thioethylene glycol, the dosing in of a mixture of 454 ml of freshly distilled acrolein and 454 ml of stabilized (with 500 ppm of hydroquinone monomethyl ether) acrylic acid was started at an addition rate of about 227 ml per hour. Thus, altogether 908 ml of monomer mixture were added within 4 hours. 80 minutes after the start of the dosing-in of monomers another 8.6 g of thioethylene glycol were added to the reaction mixture; likewise another 8.6 g of thioethylene glycol after altogether 160 minutes, counted from the start of dosing-in of monomers.

The thermostatically controlled water bath was kept at 70°C during the entire reaction; the temperature of the reaction mixture rose in the course of the reaction to 85°C.

After 817 ml of monomer mixture had been added, the reaction mixture was diluted with 324 ml of distilled water; likewise after 855 ml monomer mixture had been added and finally once more after the completion of the addition of the monomer mix. After completion of the dosing-in of monomer, stirring in the water bath thermostat-controlled at 70°C was continued for 3 hours, then the heating for the water bath was turned off and the preparation was left to itself for 12 hours.

After that, 15 vol. % of the preparation was distilled off in a water jet vacuum. The residue represented an about 30% by weight aqueous solution of a poly (aldehydocarboxylic acid) having a mean degree of polymerization of 55 (eta red = 0.075 dl/g), a carbonyl content of 22.2 basic mole % and a carboxyl content of 76.6 basic mole %. [The remaining 1.2 basic mole % corresponded to vinyl groups from the units of the formula (III)].

Checking the biological degradability:

A. On the poly (aldehydocarboxylate)

940 ml of poly (aldehydocarboxylic acid) solution from Example 3 were put in a 4 l three-necked flask. While stirring the reaction mixture and cooling it slightly (water bath), 201 ml of a 45% by weight caustic soda solution (aqueous solution) were dosed in within 2 hours. The pH of the reaction mixture was continuously controlled electrometrically in the course of the neutralization. As soon as the reaction mixture reached a pH value of 7, the dosing in of the alkali was stopped. The poly (aldehydocarboxylate) solution obtained was dried by evaporation of the water, the residue was ground and redried once more at 120°C in a water jet vacuum (12mm) for 3 hours as a powder. The pure poly (aldehydocarboxylate) obtained was used in the GF test of W. K. Fischer for the determination of the biological degradability. The BSBT value (= theoretical biochemical oxygen requirement for complete biological oxidation expressed in mg $O_2$/100 mg substrate) of poly (aldehydocarboxylate) was: 122.

In case of a substrate concentration of 2 ppm, an oxygen consumption of 0.93 ppm was measured in the GF test (starting out from air saturated water with an inoculation with about 500 germs/ cm$^3$ of filtered activated sludge suspension from a community sewage plant) after 30 days of experimentation, which corresponds to a biological degradation rate under GF test conditions of 38%.

B. On the poly (hydroxycarboxylate)

940 ml of the poly (aldehydocarboxylic acid) solution from Example 3 were put in a 4 l three-necked flask. While stirring the reaction mixture and cooling it slightly (water bath), 201 ml of a 45% by weight caustic soda solution (aqueous solution) were dosed in within 2 hours. The pH of the reaction mixture was continuously controlled electrometrically in the course of the neutralization. After dosing in this first NaOH charge, the reaction mixture had a pH of 7.0. Within 4 hours another 60 ml of 45% by weight NaOH was added, as the result of which the pH of the reaction mixture was raised to 12. This pH was maintained for 3 hours by continuous replacement of the caustic soda solution used up by the continuing Cannizzaro reaction. Altogether 290 ml of 45% by weight NaOH were consumed. Subsequently neutralization took place with a residue of not yet used poly (aldehydocarboxylic acid) solution from the same polymerization preparation to pH=7, consuming 140 ml of this acid solution.

The poly (hydroxycarboxylate) solution obtained was dried by evaporation of the water, the residue was ground and re-dried once more at 120°C in a water jet vacuum (12mm Hg) for 3 hours as a powder. The poly (hydroxycarboxylate) obtained was used in the GF test of W. K. Fischer for the determination of biological degradability. The BSBT value (expressed in mg $O_2$/100 mg substrate) of the poly (hydroxycarboxylate) was: 114.3.

In case of a substrate concentration of 2 ppm, a hydrogen consumption of 0.80 ppm was measured in the GF test (starting out from air saturated water and in case of an inoculation with about 500 germs/cm³ of filtered activated sludge suspension from a community sewage plant) after 30 days of experimentation, which corresponds to a biological degradation under GF test conditions of 35%.

EXAMPLE 4

In a 4 l three-necked flask with mechanical paddle agitator, reflux cooler, automatic temperature control by way of a resistance thermometer and a drop-in graduated funnel with 100 ml capacity, attached via a Claisen attachment beside the inlet for the thermometer, a mixture of 780 ml distilled water, 900 ml of 35% by weight hydrogen peroxide and 4.3 g of thioethylene glycol was prepared. In a water bath, thermostat-controlled at 65°C, the resulting preparation of 21% by weight $H_2O_2$ was heated to 57°C while stirring. Then, the addition of a mixture of 780 ml freshly distilled acrolein and 198 ml distilled acrylic acid was started at an addition rate of about 245 ml/hour. Thus, altogether 978 ml of monomer mixture were added within about 4 hours. Shortly (10 minutes after starting the dosing-in of monomer), the temperature of the reaction mixture rose to 65°C.

The thermostat-controlled water bath was kept during the entire reaction at 65°C; the temperature of the reaction mixture reached 76°C already 30 minutes after the start of the dosing-in of monomer, and was kept to the end of the dosing-in of monomers between 76° and 80°C. After completion of the dosing-in of monomer, stirring in the water bath, thermostat-controlled at 65°C, was continued for 3 more hours, then the heating for the water bath was turned off and the preparation was left to itself for 15 hours.

After that, 25 vol. % of the preparation was distilled off in a water jet vacuum. The residue represented an about 40% by weight aqueous solution of a poly (aldehydocarboxylic acid) having mean degree of polymerization of 15 (eta red = 0.052 dl/g), a carbonyl content of 23.5 basic mole % and a carboxyl content of 73.3 basic mole %. [The remaining 3.2 basic mole % corresponded to vinyl groups from the units of the formula (III)].

Checking of the biological degradability:

A. On the poly (aldehydocarboxylate)

400 ml of poly (aldehydocarboxylic acid) solution from Example 4 was put in a 4 l three-necked flask. While stirring the reaction mix and cooling it slightly (water bath), 110 ml of a 45% by weight caustic soda solution (aqueous solution) were dosed-in within 2 hours. The pH of the reaction mixture was controlled continuously electrometrically in the course of the neutralization. As soon as the reaction mixture had reached a pH value of 7, the dosing-in of alkali was stopped. The poly (aldehydocarboxylate) solution obtained was dried by evaporation of the water, the residue was ground and was re-dried once more at 120°C in a water jet vacuum (12mm) for 3 hours as a powder. The pure poly (aldehydocarboxylate) obtained was used in the GF test according to W. K. Fischer for determination of the biological degradability. The BSBT value (= theoretical biochemical oxygen requirement for complete biological oxidation, expressed in mg $O_2$/100 mg substrate) of the poly (aldehydocarboxylate) amounted to: 124.4

In case of a substrate concentration of 2 ppm, an oxygen consumption of 1.29 ppm was measured in the GF test (starting out from air saturated water and with an inoculation with about 500 germs/cm³ of filtered activated sludge suspension from a community sewage plant) after 30 days of experimentation, which corresponds to a biological degradation rate under test conditions of 52%.

B. On the poly (hydroxycarboxylate)

400 ml of the above poly (aldehydocarboxylic acid) solution were put in a 4 l three-necked flask. While stirring the reaction mixture and cooling it slightly (water bath), 110 ml of a 45% by weight caustic soda solution (aqueous solution) were dosed-in within 2 hours. The pH of the reaction mixture was continuously controlled electrometrically during neutralization. After dosing-in of this first NaOH charge, the reaction mix had a pH of 7.0. Addition of another 36 ml of 45% by weight NaOH was accomplished within 4 hours, as a result of which the pH of the reaction mixture was raised to 12. The pH was maintained for 4 hours by continuous replacement of the caustic soda solution, consumed by the continuing Cannizzaro reaction. Altogether 180 ml of 45% by weight NaOH were used up. Subsequently, neutralization took place with a residue of not yet used poly (aldehydocarboxylic acid) solution from the same polymerization preparation to pH=7, consuming 131 ml of this acid solution. The poly (hydroxycarboxylate) solution obtained, was brought to dryness by evaporation of the water, the residue was ground and was re-dried once more at 120°C in a water jet vacuum (14 mm Hg) for 3 hours as a powder. The poly (hydroxycarboxylate) obtained was used in the GF test of W. K. Fischer for determination of the biological degradability. The BSBT value (expressed in mg $O_2$/100 mg substrate) of the poly (hydroxycarboxylate) amounted to: 116.1.

In case of a substrate concentration of 2 ppm, an oxygen consumption of 1.11 ppm was measured in the GF test (starting out from air-saturated water and with an inoculation with about 500 germs/cm³ of filtered activated sludge suspension from a community sewage plant) after 30 days of experimentation, which corresponds to a biological degradation under GF test conditions of 48%.

C. On the poly (hydroxycarboxylate) produced while condensing with HCHO 400 ml of poly (aldehydocarboxylic acid) solution from Example 4 was put in a 4 l three-necked flask. 50 ml of 40% formaldehyde solution was added. While stirring and slightly cooling the reaction mix (water bath), 120 ml of a 45% by weight caustic soda solution (aqueous solution) were dosed in after that within 2 hours. The pH of the reaction mixture was continuously controlled electrometrically in the course of neutralization. After dosing-in of this first NaOH charge, the reaction mixture had a pH of 7.0. Another 45 ml of 45% by weight NaOH were added within 1 hour, as the result of which the pH of the reaction mixture was raised to 12.5. This pH was maintained for 8 hours by continuous replacement of the caustic soda solution consumed by the continuing Cannizzaro reaction. Altogether, 200 ml of 45% by weight NaOH were used up. Subsequently, neutralization took place with a residue of not yet used poly (aldehydocarboxylic acid) solution from the same preparation to pH=7. The poly (hydroxycarboxylate) solution obtained was dried by evaporation of the water and re-dried once more in a water jet vacuum (14 mm Hg) at 120°C, for 3 hours as a powder. The poly (hydroxycarboxylate) obtained was used in the GF test according to W. K. Fischer for the determination of the biological degradability. The BSBT value (expressed in mg $O_2$/100 mg substrate) of the poly (hydroxycarboxylate) amounted to: 115.4.

In case of a substrate concentration of 2 ppm, an oxygen consumption of 1.13 ppm was measured in the GF test (starting out from air saturated water and with an inoculation with about 500 germs/cm³ of filtered activated sludge suspension from a community sewage plant) after 30 days of experimentation, which corresponds to a biological degradation under GF test conditions of 49%.

EXAMPLE 5

In a 4 l three-necked flask with mechanical paddle agitator, reflux cooler, automatic temperature control via a resistance thermometer and a drop-in graduated measure with 100 ml capacity attached by way of a Claisen attachment beside the inlet for the thermometer, a mixture of 400 ml distilled water and 900 ml of 35% by weight of hydrogen peroxide was prepared. In a water bath, thermostat-controlled at 70°C, the preparation thus produced was heated to 60°C while stirring, at a 25% by weight $H_2O_2$. Then the addition of a mixture of 780 ml freshly distilled acrolein, 198 ml of stabilized (with 300 ppm hydroquinone) acrylic acid and 10 g thioethylene glycol was started at a rate of addition of about 245 ml per hour. Altogether, the 985 ml of monomer mixture were thus added within about 4 hours.

The thermostat-controlled water bath was kept during the entire reaction at 70°C; the temperature of the reaction mixture rose in the course of the reaction to a maximum of 82°C.

After 910 ml of monomer mixture had been added, it was diluted with 100 ml of distilled water; likewise after 940 ml of monomer mixture had been added and finally once more after completion of the addition of monomers. After completion of the dosing in of monomers, stirring was continued for another 3 hours in the water bath, thermostat-controlled at 70°C, then the heating for the water bath was turned off and the preparation was left to itself for 12 hours.

After that, 20 vol. % of the preparation were distilled away in a water jet vacuum. The residue represented an about 33% by weight aqueous solution of a poly (aldehydocarboxylic acid) having a mean degree of polymerization of 12 (eta red = 0.050 dl/g), a carbonyl content of 18.2 basic mole % and a carboxyl content of 78.3 basic mole %. [The remaining 3.5 basic mole % corresponded to vinyl groups from the units of the formula (III)].

Checking the biological degradability:

A. On the poly (aldehydocarboxylate)

700 ml of poly (aldehydocarboxylic acid) solution from Example 5 were put in a 4 l three-necked flask. While stirring and slightly cooling the reaction mixture (water bath), 170 ml of a 45% by weight caustic soda solution (aqueous solution) were dosed in within 2 hours. The pH of the reaction mixture was continuously controlled electrometrically in the course of neutralization. As soon as the reaction mixture had reached a pH value of 7, the dosing in of alkali was stopped. The poly (aldehydocarboxylate) solution obtained was dried by evaporation of the water, the residue was ground and re-dried once more at 120°C in a water jet vacuum (12 mm) for 3 hours as a powder. The pure poly (aldehydocarboxylate) obtained was used in the GF test according to W. K. Fischer for the determination of the biological degradability. The BSBT value (= Theoretical biological oxygen requirement for complete biological oxidation expressed in mg $O_2$ per 100 mg substrate) of the poly (aldehydocarboxylate) amounted to: 120.8.

In case of a substrate concentration of 2 ppm, an oxygen consumption of 1.11 ppm was measured in the GF test (starting out from air saturated water and with an inoculation with about 500 germs per cm³ of filtered activated sludge suspension from a community sewage plant) after 30 days of experimentation, which corresponds to a biological degradation rate under GF test conditions of 46%.

B. On the poly (hydroxycarboxylate)

700 ml of poly (aldehydocarboxylic acid) solution from Example 5 were put in a 4 l three-necked flask. While stirring and slightly cooling the reaction mixture (water bath), 170 ml of a 45% by weight caustic soda solution (aqueous solution) were dosed-in within 2 hours. The pH of the reaction mixture was continuously controlled electrometrically in the course of the neutralization. After dosing-in of this charge of NaOH, the reaction mixture had a pH of 7.0. Addition of another 45 ml of 45% by weight NaOH took place within 5 hours, as the result of which the pH of the reaction mix was raised to 12. This pH was maintained for 4 hours by continuous replacement of the caustic soda solution consumed by the continuing Cannizzaro reaction. Altogether, 230 ml of 45% by weight NaOH were consumed. Subsequently, this was neutralized with 20% sulfuric acid to a pH=7 while consuming 53 ml of this acid solution.

The poly (hydroxycarboxylate) solution obtained was dried by evaporation of the water, the residue was ground and re-dried once more at 120°C in a water jet vacuum (14 mm Hg) for 3 hours as a powder. The poly (hydroxycarboxylate) obtained was used in the GF test according to W. K. Fischer for the determination of the biological degradability. The BSBT value (expressed in mg $O_2$/100 mg substrate) of the poly (hydroxycarboxylate) amounted to: 114.2.

In case of a substrate concentration of 2 ppm, an oxygen consumption of 0.93 ppm was measured in the GF test (starting out from air-saturated water and with an inoculation with about 500 germs/cm³ of filtered activated sludge suspension from a community sewage plant) after 30 days of experimentation, which corresponds to a biological degradability under GF test conditions of 41%.

While even this value of biological degradability in the GF test already lies clearly above the border value of 35–40%, so that therefore this poly (hydroxycarboxylate) can be classified according to W. K. Fischer (Surfactant Detergents loc. cit.) as "sufficient" to "well biologically degradable," additionally the biological degradation behavior of the same substance was also investigated by the "official German test for detergents" (AD test; according to W. Husmann, described in the "Regulation Concerning the Degradability of Detergents in Washing and Cleaning Agents" of Dec. 1, 1962, Fed. Gazette No: 49, 1962, part 1, p. 698–706). Since the methylene-blue method suitable for anionic surfactants is unsuitable for the quantitative determination of POC concentrations, the COD values (i.e., the values of the "chemical oxygen demand" = milligram $O_2$, which are needed for the chemical oxidation of the oxidizable contents of 1 liter sample solution according to the chromate method) ("Determination of the Oxidizability" according to H4 of the German standard processes for the examination of water, 5th issue, 1968 edition, p. 6 ff) of the feed or discharge solutions were used in case of the AD test as a measure of the total concentrations of organic substances—and thus also of the POC concentrations.

Two experimental installations were operated in parallel, one of which (as a blank experiment) was charged only with the synthetic sewage used according to the AD test instruction, while in the second apparatus the feed of synthetic sewage was "stocked" with 30 ppm of the above described poly (hydroxycarboxylate). After an incorporation time of 14 days, the determination of the COD values of the "non-stocked" feed (supply) ($COD_{without\ POC}^{feed}$), of the stocked feed ($COD_{with\ POC}^{feed}$), of the discharge from the apparatus operated without POC stocking ($COD_{without\ POC}^{disch.}$) and of the discharge from the apparatus operated with POC stocking ($COD_{with\ POC}^{disch.}$) was carried out for 16 days. The values averaged over 16 days of experimentation are listed in the subsequent table:

$$\frac{feed}{COD_{without\ POC}\ discharge} = 301.2 \qquad \frac{feed}{COD_{with\ POC}\ discharge} = 326.4$$

$$\frac{}{COD_{without\ POC}} = 106.8 \qquad \frac{}{COD_{with\ POC}} = 111.3$$

According to the flow chart developed by W. Janicke [Water Research (1971) Vol. 5, p. 917–931], the following differential COD values are obtained:

$$\frac{feed}{\Delta COD} = 25.2$$

$$\frac{discharge}{\Delta COD} = 4.2$$

Thus, one will obtain as a value of the percentage, biological degradability in the AD test:

$$\% \text{ degradability} = 100\ \frac{\frac{feed}{\Delta COD} - \frac{disch.}{\Delta COD}}{\frac{feed}{\Delta COD}}$$

$$= 100\ \frac{(25.2 - 4.5)}{25.2} = 82\%$$

According to that, the poly (hydroxycarboxylate) in agreement with the GF test-result is to be classified as "biologically well degradable."

An alkali metal hydroxide is employed in the Cannizzaro reaction; as used herein, the expression "alkali metal hydroxide" refers to a hydroxide of an element from Group IA of the Periodic Table of the Elements. Preferred alkali metal hydroxides are sodium and potassium hydroxides.

In practicing this invention, the monomer or mixture of monomers and thioethylene glycol are slowly added to the reaction medium. It will be understood that these materials can be gradually added in a continuous manner over a period of time, or they can be dosed-in, such as in discrete portions spaced over a similar period of time. The time periods can be ascertained with a minimum of experimentation taking into account the foregoing detailed description of this invention.

The aqueous, hydrogen peroxide reaction medium is "moving" during the polymerization. Means for accomplishing this are well known in the art. Agitation, for example, by auxiliary means such as stirring, can be employed.

What is claimed is:

1. An improved process for the preparation of a polycarboxylate by the oxidative polymerization of acrolein or acrolein and acrylic acid, said polycarboxylate having improved biological degradability, said process comprising slowly adding acrolein monomer or an acrolein-acrylic acid monomer mixture to a heated, moving aqueous hydrogen peroxide solution, wherein the improvement comprises conducting said polymerization in the presence of about 0.1 to about 10% by weight of thioethylene glycol, related to the weight of monomer or monomer mixture.

2. Process according to claim 1 in which at least part of the thioethylene glycol is added to the hydrogen peroxide solution simultaneously with the addition of the monomer or monomer mixture.

3. Process according to claim 1 in which the monomer mixture comprises up to about 50 mole % acrylic acid.

4. Process according to claim 3 in which the monomer mixture comprises about 10 to about 30 mole % acrylic acid.

5. Process according to claim 1 in which the solution comprises about 10 to about 35% by weight hydrogen peroxide.

6. Process according to claim 1 in which the solution is heated at about 55° to about 95°C.

7. Process according to claim 1 in which the solution is heated at about 65° to about 85°C.

8. Process according to claim 1 in which the acrolein and hydrogen peroxide are present in an amount such that there are about 1.0 to 1.2 moles of acrolein per mole of hydrogen peroxide.

9. Process according to claim 1 in which the monomer or monomer mixture is added within a time of up to about 7 hours.

10. Process according to claim 1 in which the monomer or monomer mixture is added over a period of about 3 to about 5 hours.

11. Process according to claim 1 in which the thioethylene glycol is in an amount of about 0.5 to about 5% by weight.

12. Process according to claim 1 in which the thioethylene glycol is employed in an amount of about 1 to about 2% by weight.

13. Process according to claim 1 in which the resulting polymerizate is subsequently subjected to Cannizzaro reaction.

14. Process according to claim 13 in which the polymerizate is reacted with an alkali metal hydroxide.

15. Process according to claim 1 in which the monomer or monomer mixture contains up to about 500 ppm of a stabilizer which will retard spontaneous radical polymerization.

16. Process according to claim 15 in which the stabilizer is a hydroquinone monomethyl ether.

17. Process according to claim 1 in which a lower alcohol or silicone-based defoaming agent is employed during polymerization in order to decrease foaming.

18. Process according to claim 14 in which the alkali metal is sodium or potassium.

19. Process according to claim 1 in which the resulting polymerizate is subsequently subjected to Cannizzaro reaction in a dilute solution of the resulting polymerizate or a dilute alkali metal hydroxide solution or by a slow addition of alkali metal hydroxide to an agitated solution of the resulting polymerizate in order to avoid localized condensation to aldols.

20. Process according to claim 19 in which Cannizzaro reaction is carried out in the presence of formaldehyde.

21. Process according to claim 1 in which, after completion of the addition of the monomers, the aqueous solution is stirred for up to about 12 hours at about 40° to about 90°C.

22. Process according to claim 21 in which said stirring is conducted at about 50° to about 75°C after completion of the addition of the monomers.

23. Process according to claim 1 in which unreacted monomers are removed from the solution by distillation or film evaporation.

24. Process according to claim 23 in which distillation is conducted at reduced pressure and about 10 to about 40% by volume of the solution is removed.

25. Process according to claim 5 in which the hydrogen peroxide solution comprises about 15 to about 25% by weight hydrogen peroxide.

26. Process according to claim 10 in which the monomer or monomer mixture is added over a period of about 2 to about 7 hours.

\* \* \* \* \*